United States Patent
Khan et al.

(10) Patent No.: US 12,505,504 B2
(45) Date of Patent: Dec. 23, 2025

(54) UPSCALING IMAGE DATA

(71) Applicant: Sony Interactive Entertainment Europe Limited, London (GB)

(72) Inventors: Muhammad Umar Karim Khan, London (GB); Ayan Bhunia, London (GB); Aaron Chadha, London (GB); Ioannis Andreopoulos, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 333 days.

(21) Appl. No.: 18/104,238

(22) Filed: Jan. 31, 2023

(65) Prior Publication Data

US 2024/0062333 A1 Feb. 22, 2024

(30) Foreign Application Priority Data

Aug. 22, 2022 (GR) .............................. 20220100702

(51) Int. Cl.
*G06T 3/4046* (2024.01)
*G06N 3/096* (2023.01)
(Continued)

(52) U.S. Cl.
CPC ........... *G06T 3/4046* (2013.01); *G06N 3/096* (2023.01); *G06T 3/4053* (2013.01); *G06T 5/60* (2024.01);
(Continued)

(58) Field of Classification Search
CPC ....... G06T 3/4046; G06T 3/4053; G06T 5/60; G06T 5/00; G06T 5/70;
(Continued)

(56) References Cited

U.S. PATENT DOCUMENTS 11,842,460 B1 12/2023 Chen et al.
2014/0307982 A1 10/2014 Kanaev et al.
(Continued)

FOREIGN PATENT DOCUMENTS

CN 111311646 A 6/2020
CN 112767247 A 5/2021

OTHER PUBLICATIONS

He, Zibin, et al. "Fakd: Feature-affinity based knowledge distillation for efficient image super-resolution." 2020 IEEE international conference on image processing (ICIP). IEEE, 2020. (Year: 2020).*

(Continued)

*Primary Examiner* — Geoffrey E Summers
(74) *Attorney, Agent, or Firm* — Fish & Richardson P.C.

(57) ABSTRACT

Image data representing one or more images at a first resolution is received at a first artificial neural network (ANN). The image data is processed using the first ANN to generate upscaled image data representing the one or more images at a second, higher resolution. The first ANN is trained to perform image upscaling and is trained using first training image data representing one or more training images at the first resolution, the first training image data being at a first level of quality. The first ANN is also trained using features of a second ANN, wherein the second ANN is trained to perform image upscaling and is trained using second training image data representing one or more training images at the first resolution, the second training image data being at a second level of quality, higher than the first level of quality.

20 Claims, 14 Drawing Sheets

(51) Int. Cl.
　　　*G06T 3/4053*　　(2024.01)
　　　*G06T 5/60*　　　(2024.01)
　　　*G06T 5/70*　　　(2024.01)

(52) U.S. Cl.
　　　CPC ...... *G06T 5/70* (2024.01); *G06T 2207/20081* (2013.01); *G06T 2207/20084* (2013.01)

(58) Field of Classification Search
　　　CPC .......... G06T 2207/20081; G06T 2207/20084; G06N 3/096; G06N 3/08
　　　See application file for complete search history.

(56) References Cited

U.S. PATENT DOCUMENTS

| | | |
|---|---|---|
| 2016/0191753 A1 | 6/2016 | Jin et al. |
| 2021/0027426 A1* | 1/2021 | Ma ........................... G06T 5/70 |
| 2023/0021463 A1 | 1/2023 | Chee et al. |
| 2024/0070819 A1 | 2/2024 | Bhunia et al. |
| 2025/0061547 A1* | 2/2025 | Hwang ..................... G06T 5/60 |

OTHER PUBLICATIONS

Gao, Zhao, Eran Edirisinghe, and Slava Chesnokov. "Image super-resolution using cnn optimised by self-feature loss." 2019 IEEE International Conference on Image Processing (ICIP). IEEE, 2019. (Year: 2019).*

Zhang, Richard, et al. "The Unreasonable Effectiveness of Deep Features as a Perceptual Metric." 2018 IEEE/CVF Conference on Computer Vision and Pattern Recognition. IEEE, 2018. (Year: 2018).*

Bhat et al., "Deep Burst Super-Resolution," Paper, 2021 IEEE/CVF Conference on Computer Vision and Pattern Recognition, 2021, pp. 9205-9214.

Chen et al., "Optical flow distillation: Towards efficient and stable video style transfer," Computer Vision—ECCV 2020: 16th European Conference, Glasgow, UK, Aug. 23-28, 2020, Proceedings, Part VI 16, pp. 614-630.

Dosovitskiy et al., "FlowNet: Learning Optical Flow with Convolutional Networks," Paper, 2015 IEEE International Conference on Computer Vision, 2015, pp. 2758-2766.

Hur et al., "Optical flow estimation in the deep learning age," Modelling human motion: from human perception to robot design, 2020, pp. 119-140.

Ihler et al., "Patient-specific domain adaptation for fast optical flow based on teacher-student knowledge transfer," CoRR, Submitted on Jul. 9, 2020, arXiv:2007.04928v1, 10 pages.

Ihler et al., "Self-supervised domain adaptation for patient-specific, real-time tissue tracking," Paper, MICCAI 2020: 23$^{rd}$ International Conference, Lima, Peru, Oct. 4-8, 2020, pp. 54-64.

Ilg et al., "FlowNet 2.0: Evolution of Optical Flow Estimation with Deep Networks," Paper, 2017 IEEE Conference on Computer Vision and Pattern Recognition (CVPR), 2017, pp. 1647-1655.

Liu et al, "Learning by distillation: a self-supervised learning framework for optical flow estimation," IEEE Transactions on Pattern Analysis and Machine Intelligence, Sep. 2022, 44(9):5026-5041.

Liu et al., "DDFlow: Learning optical flow with unlabeled data distillation," Paper, Proceedings of the AAAI conference on artificial intelligence, 2019, 33(1):8770-8777.

Ranjan et al., "Optical Flow Estimation using a Spatial Pyramid Network," Paper, 2017 IEEE Conference on Computer Vision and Pattern Recognition, Jul. 21, 2017, 2720-2729.

Tassano et al., "Dvdnet: A fast network for deep video denoising," Paper, 2019 IEEE International Conference on Image Processing (ICIP), 2019, pp. 1805-1809.

Tran et al., "Light-weight deformable registration using adversarial learning with distilling knowledge," IEEE Transactions on Medical Imaging, Jun. 2022, 41(6):1443-1453.

Trinidad et al., "Multi-View Image Fusion," Paper, 2019 IEEE/CVF International Conference on Computer Vision, Oct. 27, 2019, 4101-4109.

Tu et al., "Optical flow for video super-resolution: A survey," Artificial Intelligence Review 55.8. 2022, pp. 6505-6546.

Wang et al., "Real-time surgical environment enhancement for robot-assisted minimally invasive surgery based on super-resolution," Paper, 2021 IEEE International Conference on Robotics and Automation (ICRA), May 31-Jun. 4, 2021, pp. 3434-3440.

Xue et al., "Video Enhancement with Task-Oriented Flow," International Journal of Computer Vision, Feb. 12, 2019, 127:1106-1125.

Yao et al., "Guided Learning for Efficient Optical Flow Estimation," Paper, 2020 2nd International Conference on Machine Learning, Big Data and Business Intelligence, 2020, pp. 36-39.

He Zibin et al., "Fakd: Feature-Affinity Based Knowledge Distillation for Efficient Image Super-Resolution," 2020 IEEE International Conference on Image Processing (ICIP), 2020, pp. 518-522, Abu Dhabi, United Arab Emirates.

Licheng Li et al., "Game Image Quality Enhancement Algorithm based on Generative Adversarial Network and Knowledge Distillation," 2022 IEEE 10th Joint International Information Technology and Artificial Intelligence Conference (ITAIC), 2022, pp. 2570-2575, Chongqing, China.

Sai Mitheran J et al., "Rich Feature Distillation with Feature Affinity Module for Efficient Image Dehazing," Optik, Oct. 2022, vol. 267.

Jianping Gou et al., "Knowledge Distillation: A Survey", arXiv, May 20, 2021, pp. 1789-1819.

Özgün Yilmaz, European Search Report EP 22 21 3946, Aug. 22, 2023, European Patent Office, Munich, Germany.

* cited by examiner $$g(\Theta_{10}^1 x_0 + \Theta_{11}^1 x_1 + \Theta_{12}^1 x_2 + \Theta_{13}^1 x_3)$$

$\Theta_{13}^1$ means:

1 (superscript) - mapping from layer 1
1 - mapping to node 1 in layer 2 (L+1)
3 - mapping from node 3 in layer 1 (L)

$$a_1^{(2)} = g(\Theta_{10}^{(1)}x_0 + \Theta_{11}^{(1)}x_1 + \Theta_{12}^{(1)}x_2 + \Theta_{13}^{(1)}x_3)$$
$$a_2^{(2)} = g(\Theta_{20}^{(1)}x_0 + \Theta_{21}^{(1)}x_1 + \Theta_{22}^{(1)}x_2 + \Theta_{23}^{(1)}x_3)$$
$$a_3^{(2)} = g(\Theta_{30}^{(1)}x_0 + \Theta_{31}^{(1)}x_1 + \Theta_{32}^{(1)}x_2 + \Theta_{33}^{(1)}x_3)$$
$$h_\Theta(x) = a_1^{(3)} = g(\Theta_{10}^{(2)}a_0^{(2)} + \Theta_{11}^{(2)}a_1^{(2)} + \Theta_{12}^{(2)}a_2^{(2)} + \Theta_{13}^{(2)}a_3^{(2)})$$

(a)                  (b)

(c)

UPSCALING IMAGE DATA

CROSS-REFERENCE TO RELATED APPLICATIONS

This application claims the benefit of Greek Patent Application No. 20220100702, filed on Aug. 22, 2022, the entire contents of which are incorporated herein by reference.

INTRODUCTION

Technical Field

The present disclosure concerns computer-implemented methods of processing image data. The disclosure is particularly, but not exclusively, applicable where the image data is video data.

BACKGROUND

In many applications, it is desirable to upscale image or video data. Image upscaling (also referred to as "super-resolution") involves increasing the resolution of an image. That is, an image at a first resolution (at which the image is represented by a first number of pixels) may be upscaled to a second, higher resolution (at which the image is represented by a second, greater number of pixels). This increases the amount of information and/or detail included in the image. Super-resolution allows, for example, for low-resolution images to be transmitted via a transmission medium which may have a limited bandwidth, and for high-resolution images to be subsequently displayed to a user on a display device.

Some known methods of performing image upscaling involve the use of artificial neural networks (ANNs). Such ANNs may be trained by receiving low-resolution input images, upscaling the input images, and adjusting the ANN so as to minimize a difference between the upscaled images and corresponding ground-truth high-resolution images. Once trained, the ANN may be used to process previously-unseen low-resolution images to generate high-resolution images.

It is technically challenging for an ANN to obtain a high-resolution image from a low-resolution image. The task is further complicated, however, if the input image is corrupted or degraded, e.g. by noise or compression, as critical details of the scene depicted in the image may be lost or altered. That is, the input images may be not only at a low resolution (e.g. have a relatively small number of pixels) but also at a low level of quality. Many practical situations operate with compressed or noisy images. For example, images may be compressed for storage and/or transmission via a network, end users may capture relatively low quality (e.g. noisy) images using a camera, etc. Such corruption may lead to a loss of information, which consequently affects the visual quality of the resulting upscaled high-resolution images.

The present disclosure seeks to solve or mitigate some or all of these above-mentioned problems. Alternatively and/or additionally, aspects of the present disclosure seek to provide improved methods of processing image data.

SUMMARY

In accordance with a first aspect of the present disclosure there is provided a computer-implemented method of processing image data, the method comprising: receiving, at a first artificial neural network, ANN, image data representing one or more images at a first resolution; processing the received image data using the first ANN to generate upscaled image data representing the one or more images at a second, higher resolution; and outputting the upscaled image data from the first ANN, wherein the first ANN is trained to perform image upscaling and is trained using: first training image data representing one or more training images at the first resolution, the first training image data being at a first level of quality; and a feature vector comprising features generated by one or more layers of a second ANN, wherein the second ANN is trained to perform image upscaling and is trained using second training image data representing one or more training images at the first resolution, the second training image data being at a second level of quality, higher than the first level of quality.

Image data at the first, lower level of quality may be referred to as "corrupted" image data, whereas image data at the second, higher level of quality may be referred to as "uncorrupted" or "clean" image data. Whether the image data is corrupted or uncorrupted (that is, at the first level of quality or the second level of quality) is separate from the resolution of the image data. Resolution refers, for example, to the number of pixels representing the image. In other words, "level of quality" as used herein refers to a level of quality other than resolution. That is, two images at the same resolution (i.e. having the same number of pixels) may be at two different levels of quality. The first training image data and the second training image data are at the same resolution (and may, optionally, represent the same training images), but the first training image data and the second training image data are at different levels of quality. The first and second levels of quality may correspond to different amounts of corruption, different amounts of image noise, different amounts of compression, different amounts of distortion, different degrees of fidelity to a reference image, etc. In some examples, the first and second levels of quality correspond to different amounts of image enhancement, e.g. the second training image data may be enhanced (e.g. de-noised) relative to the first training image data.

"Features" of an ANN refers to outputs produced from the activations of a given layer of the ANN. These may be referred to as "features" or "feature vectors" of one or more ANN layers, because they correspond to the output features of each ANN layer that are produced as a response to input data. That is, the features of the second ANN used to train the first ANN may comprise outputs of one or more layers of the second ANN, e.g. obtained by passing the second training data through the one or more layers of the second ANN. In embodiments, the features of the second ANN used to train the first ANN comprise outputs of one or more intermediate layers of the second ANN, e.g. obtained by passing the second training data through the intermediate layers of the second ANN.

By processing the received image data using the first ANN, where the first ANN has been trained using not only training image data representing low-resolution training images at a low level of quality, but also features of a second ANN which has been trained using training image data representing low-resolution training images at a higher level of quality, upscaling is performed more accurately, and/or a visual quality of the upscaled images generated by the first ANN is improved. This allows end-users to view images or videos at an improved level of visual quality despite receiving low quality and low resolution images. The presently-described methods also allow an image processing apparatus (e.g. at a server) to enhance low quality and low resolution images that have been obtained by users. Moreover, the presently-described methods provide an improved use of bandwidth of a transmission medium, since low-resolution and low quality (e.g. compressed) images can be transmitted via the transmission medium (which may have a limited bandwidth), and high-resolution images can subsequently be generated at a high level of visual quality.

Training the first ANN using the features of the second ANN improves the performance of the first ANN in performing image upscaling, because the second ANN has been trained using higher quality training data compared to the first ANN. As such, the features of the second ANN have been obtained with training data that has information that may be missing or lost for the first ANN (since its training data is at the lower level of quality, e.g. by being corrupted). Such information can be recovered and utilized because the training data of the second ANN is at the higher level of quality. The features of the second ANN are used during the training of the first ANN, in order to improve the performance of the first ANN. In other words, knowledge is transferred from the second ANN (which has learned from high quality images) to the first ANN (which has learned from low quality images). Therefore, an improved image processing system is provided, compared to a case in which the first ANN is not trained using the features of a second ANN that has been trained using higher quality training data. In particular, the visual quality of the upscaled images generated by the first ANN is improved, compared to methods in which corrupted images are used for training but uncorrupted images (via the second ANN) are not utilized.

Further, the first ANN, trained in the manner described above, is able to perform image upscaling more accurately and/or reliably compared to the second ANN. This is because the second ANN has been trained using only uncorrupted training images (e.g. images not suffering from information loss due to corruption) whereas during deployment in real-life scenarios, the image data that is to be processed using the trained image upscaler is likely to be corrupted, e.g. compressed, subject to noise, etc. The first ANN, which is trained using corrupted images as well as the features of the second ANN, is better adapted for such scenarios than the second ANN. Therefore, an improved image processing system for performing upscaling is provided, compared to a case in which only the second ANN (trained using uncorrupted image data) is used for deployment. In other words, while the second ANN alone may be sufficient to accurately upscale uncorrupted (high quality) images, the performance of the second ANN would degrade when the input images are corrupted (low quality). The first ANN can perform better than the second ANN for processing corrupted input images, since it has been trained using corrupted images while also being supervised by the second ANN.

In embodiments, the first ANN and the second ANN have the same architecture. This may facilitate alignment of the features of the first ANN with the features of the second ANN. The first ANN and the second ANN are trained to perform the same overall task, namely image upscaling. However, the first ANN is trained to perform upscaling on low quality input images (e.g. corrupted input images), whereas the second ANN is trained to perform upscaling on high quality input images (e.g. uncorrupted input images).

In embodiments, the first ANN and the second ANN comprise the same number of layers and/or parameters. In embodiments, the first ANN comprises more layers and/or parameters than the second ANN. In some cases, the first ANN comprises the same number of layers but more parameters than the second ANN. As such, the first ANN is not smaller or less complex than the second ANN. That is, the first ANN does not comprise fewer layers than the second ANN, and/or the first ANN does not comprise fewer parameters than the second ANN. This is in contrast with known methods involving knowledge distillation, in which knowledge is transferred from a larger, more complex neural network to a smaller, less complex neural network. For example, a smaller student network may be trained to mimic the outputs (e.g. softmax outputs, intermediate features, etc.) of a larger teacher network. Rather than using knowledge distillation merely for network compression, or for knowledge transfer across different tasks, as in the known methods, the presently described methods distil knowledge from a neural network that has been trained using uncorrupted images into a neural network that has been trained using corrupted images, in order to improve the super-resolution quality of upscaled images generated using corrupted low-resolution images. As such, knowledge distillation in the presently described methods is employed for improving the quality of upscaled images, rather than reducing the complexity or size of the student network.

In embodiments, the image data representing the one or more images that is received and processed at the first ANN is different from the training image data that is used to train the first ANN and the second ANN. Receiving the image data representing the one or more images, processing that image data using the first ANN and outputting the upscaled image data from the ANN, as described above, is a process occurring during deployment (or "inference") of the first ANN after the first ANN has been trained. As such, in embodiments, the first ANN has already been trained to perform image upscaling, using the first training image data and the features of the second ANN, when the image data representing the one or more images is received. It will be understood, however, that in some embodiments training can also take place periodically or continuously during inference, e.g. based on new data, and the first ANN and/or the second ANN can be adjusted and/or new versions produced, based on such periodic or continuous training.

In embodiments, the feature vector of the second ANN comprises an intermediate feature vector comprising features generated by one or more intermediate layers of the second ANN. That is, the first ANN may be trained using one or more intermediate feature vectors comprising features generated by one or more intermediate layers of the second ANN. The intermediate feature vector may comprise features (or outputs) generated by one or more layers other than the final layer of the second ANN. In some examples, the intermediate feature vector has a higher dimensionality than the output of the final layer of the second ANN. In embodiments, the intermediate feature vectors are used as a target for training the first ANN. Intermediate feature vectors may be a more reliable training target for the first ANN than an output from the final layer of the second ANN. As such, using intermediate feature vectors as training targets for the first ANN may result in the first ANN being able to perform image upscaling more accurately than using other data as training targets. In alternative embodiments, the intermediate feature vector comprises features generated by one or more intermediate layers of the second ANN and also the final layer of the second ANN.

In embodiments, the first ANN is trained using a feature regularization loss function configured to determine a difference between a feature vector comprising features generated by one or more layers of the first ANN (e.g. an intermediate feature vector comprising features generated by one or more intermediate layers of the first ANN) and the feature vector generated by the second ANN. In such embodiments, the first ANN is trained by adjusting the first ANN to reduce the difference as determined by the feature regularization loss function. Such an adjustment may be an iterative adjustment, for example. In other words, the feature regularization loss function is used to align the features of the first ANN to the features of the second ANN. This results in the first ANN being able to perform image upscaling more accurately than a case in which the features of the first ANN are not aligned to the features of the second ANN. In embodiments, determining a difference between feature vectors comprises determining a sum of the differences (e.g. absolute differences) between corresponding components (e.g. features) in each of the feature vectors. In embodiments, the feature regularization loss function is configured to determine a plurality of differences between the feature vectors. For example, the feature regularization loss function may calculate a difference between corresponding features for each of the features in the feature vectors.

In embodiments, the feature regularization loss function is operable to determine at least one of: a least absolute deviations (L1)-norm loss, a divergence loss, and an adversarial loss, between the feature vector generated by the first ANN and the feature vector generated by the second ANN. The first ANN is adjusted (e.g. by adjusting the weights of the first ANN) to minimize such losses, thereby aligning the features of the first ANN to the features of the second ANN. This enables the first ANN to perform image upscaling with an improved accuracy. Adjusting the first ANN may be performed using back-propagation of errors and stochastic gradient descent, for example.

In embodiments, the first ANN is trained using a third ANN configured to distinguish between features of the first ANN and features of the second ANN. This uses the principle of adversarial training, whereby the first ANN is trained to "fool" the third ANN into presuming that the features of the first ANN are actually features of the second ANN. Such a method can advantageously be employed regardless of whether the first ANN and the second ANN are trained using the same training images at different levels of quality, or different training images altogether. Different training images may be used, for example, where the type of corruption expected during inference is not known.

In embodiments, the image data representing the one or more images at the first resolution received at the first ANN is at the first level of quality. In other words, the received image data (received during inference) may be corrupted image data. Such corrupted image data may have been compressed, subject to noise, etc. Since the first ANN has been trained using training image data at the first level of quality (e.g. corrupted image data), as well as the features of the second ANN which has been trained using training image data at a higher level of quality (e.g. uncorrupted image data), the first ANN is able to more accurately upscale the image data representing the one or more images. That is, the first ANN has been trained using training data that represents or approximates the actual real-life data that is encountered by the first ANN, namely image data at the lower level of quality.

In embodiments, the first training image data and the second training image data represent the same one or more images at different levels of quality. In other words, the first ANN and the second ANN may be trained using the same training images, but the first ANN is trained using a low quality version of the training images and the second ANN is trained using a high quality version of the training images. This allows the same ground truth high-resolution images to be used to train both neural networks, and also facilitates the supervision of training of the first ANN by the second ANN, since the two neural networks have processed the same images. For example, the features of the first ANN may be directly compared with the features of the second ANN, e.g. by the feature regularization loss function.

In embodiments, the first training data is generated by corrupting the second training image data. As such, the relationship between the first training image data and the second training image data may be controlled, e.g. by controlling the type and/or amount of corruption applied to the second training image data to generate the first training image data. Different types and/or amounts of corruption may be applied to the second training image data, in order to train the first ANN to be robust to corresponding types and/or amounts of corruption in input images encountered during inference. In embodiments, corrupting the second training image data is based on an expected type and/or amount of corruption associated with the image data representing the one or more images received at the first ANN. This enables the training of the first ANN to be tailored to a specific scenario or application, having a particular type and/or amount of corruption present in input images that are to be upscaled by the first ANN. If it is anticipated or expected that, during inference, input low-resolution images will be corrupted in a particular manner, the first ANN can be trained using data that is also corrupted in the same manner. This improves the accuracy of upscaling performable by the first ANN.

In embodiments, corrupting the second training image data comprises applying noise to the second training image data. For example, Gaussian or salt-and-pepper noise may be applied to the second training image data to obtain the first training image data. The type and/or amount of noise applied to the second training image data may correspond to an anticipated or expected type and/or amount of noise in input images that will be encountered during inference. This enables the first ANN to be trained to perform image upscaling while being robust to noise in the input images received by the first ANN during inference.

In embodiments, corrupting the second training image data comprises compressing the second training image data. The second training image data may be compressed using one or more compression parameters. The one or more compression parameters may be determined based on compression parameters that are anticipated and/or expected to be encountered during inference. Examples of such compression parameters include quantization parameters, transform parameters, entropy coding parameters, etc. This enables the first ANN to be trained to perform image upscaling while being robust to lossy compression artefacts.

In alternative embodiments, the second training image data is generated by enhancing the first training image data. For example, the second training image data may be generated by de-noising the first training image data, thereby increasing the level of quality of training image data. This allows the relationship between the first training image data and the second training image data to be controlled, e.g. by controlling the type and/or amount of enhancement applied to the first training image data to generate the second training image data.

In embodiments, the first ANN and the second ANN are trained simultaneously. That is, the first ANN and the second ANN may be trained together in parallel. For example, a step of updating the weights of the second ANN may be followed by a step of updating the weights of the first ANN, which may be followed by another step of updating the weights of the second ANN, and so on. This may be more efficient, particularly, but not exclusively, where the first ANN and the second ANN are trained using the same batch of training images. In alternative embodiments, the first ANN is trained after the second ANN has been trained. This enables the first ANN to receive the highest quality (e.g. "finalized") outputs from the trained second ANN, thereby enabling the first ANN to perform image upscaling more accurately.

In embodiments, the first ANN is trained by minimizing losses between upscaled image data, generated by the first ANN using the first training image data and representing the one or more training images at the second resolution, and ground truth image data representing the one or more training images at the second resolution. Such losses may comprise fidelity losses, indicative of a similarity between the generated upscaled image data and the ground truth image data. Additionally or alternatively, the losses may comprise perceptual losses, indicative of a perceptual level of visual quality of the generated upscaled image data. As such, the first ANN may be trained to accurately reconstruct the ground truth high-resolution image data from the low-resolution and low quality training image data. Similarly, the second ANN may be trained by minimizing losses between upscaled image data, generated by the second ANN using the second training image data and representing the one or more training images at the second resolution, and ground truth image data representing the one or more training images at the second resolution. As such, the second ANN may be trained to accurately reconstruct the ground truth high-resolution image data from the low-resolution and high quality training image data. In embodiments, for example where the first ANN and the second ANN are trained using the same training images, the same ground truth image data at the second resolution may be used to train both the first ANN and the second ANN.

In embodiments, the first ANN comprises a convolutional neural network (CNN). The second ANN may also comprise such a CNN. Advantageously, such a neural network comprises multiple layers having a convolutional architecture, with each layer being configured to receive the output of one or more previous layers. Such an artificial neural network may comprise a set of interconnected adjustable weights and activation functions. In embodiments, the outputs of each layer of the neural network are passed through a non-linear parametric linear rectifier function, pReLU. Other non-linear functions may be used in other embodiments.

In embodiments, image data of a given image comprises pixel values of the image. As such, image data of the image at different resolutions comprises different numbers of pixel values. In alternative embodiments, image data of a given image comprises features of the image derivable from the pixel data, e.g. in a latent space. In further alternative embodiments, image data of a given image comprises residual data.

As discussed above, the first training image data and the second training image data may be at the same resolution (namely the first resolution) but different levels of quality. In some embodiments, the first training image data and the second training image data are at different resolutions. However, in such cases the resolutions of the first training image data and the second training image data are both lower than the second resolution (i.e. the resolution of the upscaled images). As such, both the first training image data and the second training image data may be referred to as "low-resolution" image data.

As mentioned above, the first ANN is trained using a feature vector comprising features generated by one or more layers of the second ANN. Such a feature vector is an example of an output of the second ANN (e.g. an intermediate output). Other outputs of the second ANN may be used to train the first ANN in alternative embodiments. For example, the output of a final layer of the second ANN may be used as a training input for the first ANN in some cases. In embodiments, the first ANN is trained using features generated by one or more layers (e.g. one or more intermediate layers) of the second ANN, but such features may not be represented as a vector.

The methods of processing image data described herein may be performed on a batch of video data, e.g. a complete video file for a movie or the like, or on a stream of video data. In embodiments, the received image data represents a portion of an image or video frame, e.g. a block or sub-region of an image.

In accordance with another aspect of the present disclosure, there is provided a computer-implemented method of configuring an ANN, the method comprising: receiving, at a first ANN, first image data representing one or more training images at a first resolution, the first image data being at a first level of quality; receiving at the first ANN, data derived from features of a second ANN, the second ANN having been trained to generate upscaled image data at a second, higher resolution, the second ANN having been trained using second image data representing one or more training images at the first resolution, the second image data being at a second level of quality, higher than the first level of quality; and using the first image data and the data derived from the features of the second ANN to train the first ANN to perform image upscaling.

In accordance with another aspect of the disclosure there is provided a computing device comprising: a processor; and memory; wherein the computing device is arranged to perform using the processor any of the methods described above.

In accordance with another aspect of the disclosure there is provided a computer program product arranged, when executed on a computing device comprising a processor or memory, to perform any of the methods described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings.

DETAILED DESCRIPTION

Embodiments of the present disclosure are now described.

Figure 1:
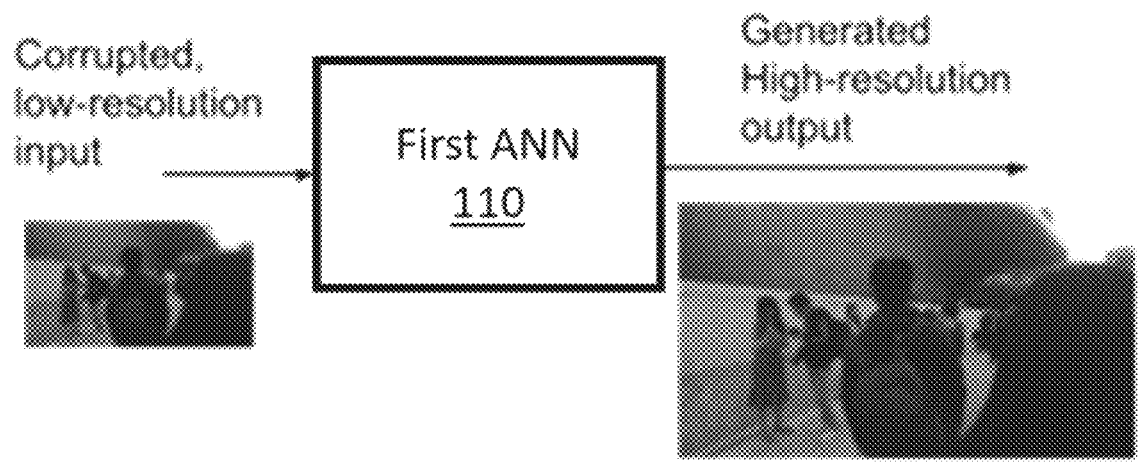
FIG. 1 is a schematic workflow diagram showing an example of image processing in accordance with embodiments.

FIG. 1 is a schematic diagram showing an example of image processing, according to embodiments. In particular, FIG. 1 shows a first artificial neural network (ANN) 110 that has been trained to perform image upscaling. That is, FIG. 1 shows the trained first ANN 110 operating during inference, or deployment of the first ANN 110. The first ANN 110 is configured to receive a low-resolution input image and to generate a high-resolution output image based on the low-resolution input image. In the example shown in FIG. 1, the low-resolution input image has been corrupted, or is otherwise at a low level of quality. For example, the low-resolution input image may have been compressed, subject to noise, etc. The configuration and training of the first ANN 110 is described in more detail below.

The embodiments described herein are applicable to batch processing, i.e. processing a group of images or video frames together without delay constraints (e.g. an entire video sequence), as well as to stream processing, i.e. processing only a limited subset of a stream of images or video frames, or even a select subset of a single image, e.g. due to delay or buffering constraints.

Figure 2:
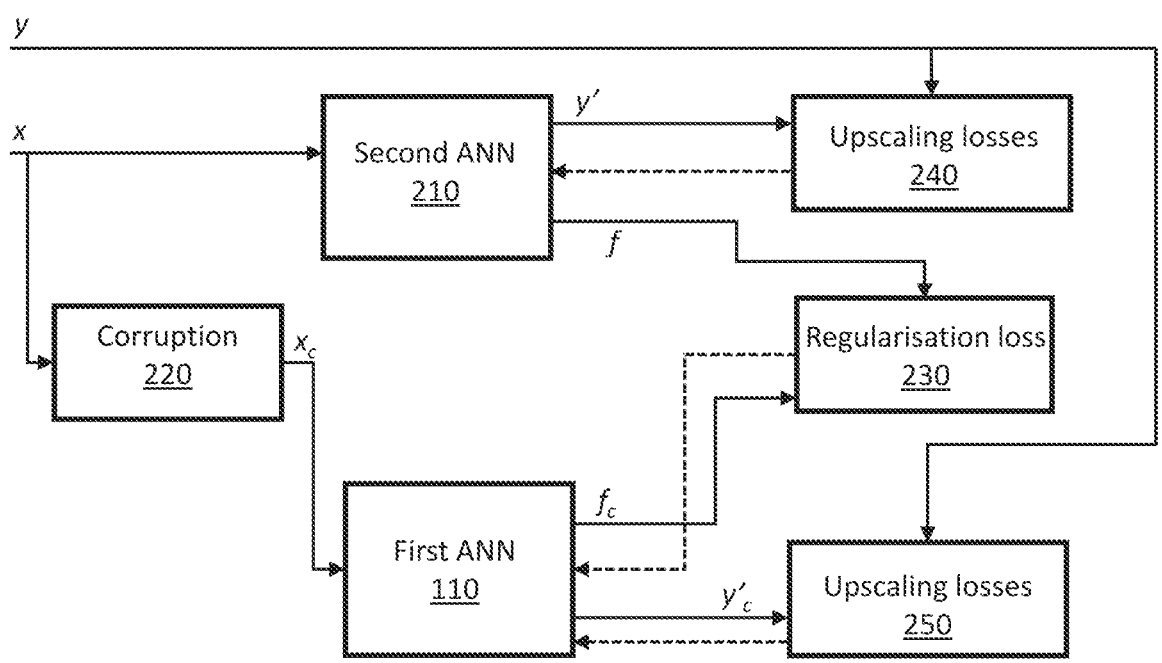
FIG. 2 is a schematic workflow diagram showing an example training process in accordance with embodiments.

FIG. 2 shows schematically a training process for training the first ANN 110, according to embodiments. The training process enables the performance of the first ANN 110 in upscaling images to be improved, e.g. in terms of the visual quality and/or accuracy of the produced upscaled images. That is, the trained first ANN 110 which results from the training process of FIG. 2 is an improved ANN compared to an ANN which has not been trained using such a training process.

As shown in FIG. 2, in addition to the first ANN 110, a second ANN 210 is provided. The second ANN 210 is used in the training of the first ANN 110.

The second ANN 210 has the same architecture as the first ANN 110, according to embodiments. The second ANN 210 is trained to perform upscaling for low-resolution input images that are at a high level of quality. Such images may be referred to as "uncorrupted" or "clean" images. As depicted in FIG. 2, image x is an example of such an uncorrupted image, and is received at the second ANN 210. The second ANN 210 upscales the image x to generate upscaled image y', which is it a higher resolution than the received image x. The upscaled image y' is compared with a ground truth high-resolution image y using an upscaling loss function 240, e.g. to determine one or more losses between the generated image y' and the ground truth image y. The losses are fed back to the second ANN 210 to enable the second ANN 210 to be adjusted, e.g. to reduce such losses. Such feedback may be based on back-propagation of errors and stochastic gradient descent, for example, and is shown with a dashed arrow in FIG. 2. In embodiments, the input low-resolution image x is generated by downscaling the ground-truth high-resolution image y.

In embodiments, back-propagation learning uses learning rules that are deterministic or stochastic (e.g. done after averaging over batches of arbitrarily sampled inputs/outputs). Gradients can be computed on single inputs, on batches of inputs or on the whole training dataset, per training iteration. The learning parameters, such as the initial learning rate and learning rate decay, can be empirically tuned to optimize speed of training and performance. Batches of training data can be selected in a deterministic or random/pseudo-random manner.

In contrast with the second ANN 210, the first ANN 110 is trained to perform upscaling for input images at a low level of quality. Such images may be referred to as "corrupted", "noisy", or "compressed", images. In the example shown in FIG. 2, the uncorrupted image x which is input to the second ANN 210 is also input to a corruption unit 220, which corrupts the image x to produce corrupted image $x_c$. The corrupted image $x_c$ is at the same resolution as the uncorrupted image x in this example, but is at a lower level of quality than the uncorrupted image x. The corrupted image $x_c$ is then input to the first ANN 110. The first ANN 110 upscales the image $x_c$ to generate upscaled image $y'_c$, which is at a higher resolution than the received image $x_c$. In this example, the upscaled image $y'_c$ produced by the first ANN 110 is at the same resolution as the upscaled image y' produced by the second ANN 210. The upscaled image $y'_c$ produced by the first ANN 110 is compared with the ground truth high-resolution image y using an upscaling loss function 250, e.g. to determine one or more losses between the generated image $y'_c$ and the ground truth image y. As with the second ANN 210, the calculated losses are fed back to the first ANN 110 to enable the first ANN 110 to be adjusted, e.g. using back-propagation of errors and stochastic gradient descent. Such feedback is shown with a dashed arrow in FIG. 2.

The losses calculated by the upscaling loss functions 240, 250 (between the ground truth image y and the upscaled images $y'_c$ and y', respectively) may comprise a number of different loss functions. Examples of such loss functions include, but are not limited to, a least absolute deviations (L1) reconstruction loss, a structural similarity (SSIM) reconstruction loss, perceptual loss, and generative adversarial network (GAN) loss. Moreover, in embodiments, the upscaling loss functions 240, 250 are configured to calculate a weighted sum of a plurality of different loss functions. For n different loss functions, the upscaling loss for a neural network is given by:

$$L_{ups} = <\omega, L>, \text{ where } \omega, L \in R^n.$$

In one example, the loss functions include a weighted combination of an L1 loss, an SSIM loss, and a perceptual loss. If the weights assigned to each of these losses are 0.1, 0.3 and 0.6, respectively, the overall upscaling loss can be represented as:

$$L_{ups}(I_{gen}, I_{gt}) = 0.1 L_1(I_{gen}, I_{gt}) + 0.3 L_{ssim}(I_{gen}, I_{gt}) + 0.6 L_{perc}(I_{gen}, I_{gt})$$

where $I_{gen}$, $I_{gt}$, $L_1$, $L_{ssim}$, and $L_{perc}$ denote the image generated by the neural network, the ground truth image, the L1 loss, the SSIM loss and the perceptual loss, respectively. The upscaling loss function 240 for training the second ANN 210 and the upscaling loss function 250 for training the first ANN 110 may comprise the same or different loss functions.

In addition to the upscaling loss function 250, the first ANN 110 is trained using a regularization loss function 230. The regularization loss function 230 is configured to compare features f of the second ANN 210 with features $f_c$ of the first ANN 110, and to provide feedback to the first ANN 110 based on such a comparison. Such feedback is shown with a dashed arrow in FIG. 2. The first ANN 110 is adjusted so as to try to align the features $f_c$ of the first ANN 110 with the features f of the second ANN 210. In other words, the first ANN 110 is trained to generate features that are similar to the features of the second ANN 210. The features f of the second ANN 210 may comprise one or more intermediate feature vectors output from one or more intermediate layers of the second ANN 210, as will be described in more detail below. Similarly, the features $f_c$ of the first ANN 110 may comprise one or more intermediate feature vectors output from one or more intermediate layers of the first ANN 110.

As such, the first ANN 110 is trained not only by comparing its generated upscaled image $y_c'$ with a ground truth high-resolution image y, but also by comparing the features $f_c$ of the first ANN 110 with the features f of the second ANN 210, where the second ANN 210 is trained using input image data that has a higher level of quality than the image data that is input to the first ANN 110. This results in improved performance of the first ANN 110.

Accordingly, the first ANN 110 and the second ANN 210 may be trained using different objective functions. Using the previous example of a combination of L1, SSIM and perceptual losses, the upscaling loss for the first ANN 110 is given by: $L^{(1)}_{ups}(I^{(1)}_{gen}, I_{gt}) = 0.1\ L_1(I^{(1)}_{gen}, I_{gt}) + 0.3 L_{ssim}(I_{gen}, I_{gt}) + 0.6\ L_{perc}(I^{(1)}_{gen}, I_{gt})$, where $I^{(1)}_{gen}$ is the output generated by the first ANN 110 (using the corrupted image $x_c$). Similarly, the upscaling loss for the second ANN 210 may be given by:

$$L^{(2)}_{ups}(I^{(2)}_{gen}, I_{gt}) = 0.1 L_1(I^{(2)}_{gen}, I_{gt}) + 0.3 L_{ssim}(I^{(2)}_{gen}, I_{gt}) + 0.6 L_{perc}(I^{(2)}_{gen}, I_{gt})$$

where $I^{(2)}_{gen}$ is the output generated by the second ANN 210 (using the uncorrupted image x).

Training of the second ANN 210 involves adjusting the weights of the second ANN 210 to minimize the loss function $L^{(2)} = L^{(2)}_{ups}$. In contrast, however, training of the first ANN 110 involves adjusting the weights of the first ANN 110 to minimise the loss function $L^{(1)} = L^{(1)}_{ups} + L_{reg}$, where $L_{reg}$ is a regularization loss derived using the regularization loss function 230. Accordingly, the first ANN 110 and the second ANN 210 are trained using different objective functions.

The weights of the first ANN 110 and the second ANN 210 may be updated according to any desired schedule. For example, the weights of the two ANNs may be updated in conjunction, e.g. a single weight-update step of the second ANN 210 is followed by a single weight-update step of the first ANN 110, and so on. In alternative embodiments, the second ANN 210 is fully trained prior to training the first ANN 110. The first ANN 110 is then trained while keeping the weights of the second ANN 210 fixed.

For brevity, training and inference are described herein as two separate 'offline' and 'online' stages. However, it will be understood that training can also take place periodically or continuously during inference, e.g. based on new data, and the first ANN 110 and/or the second ANN 210 can be adjusted and/or new versions produced, based on such periodic or continuous training.

As described above, the corruption unit 220 shown in FIG. 2 corrupts the uncorrupted image x to generate the corrupted image $x_c$. This may be based on a type and/or amount of corruption that is known or expected during inference, e.g. corruption that it is expected the trained first ANN 110 will encounter when deployed. For example, if the first ANN 110 is being trained to be an upscaler robust to Gaussian noise or salt-and-pepper noise, the corruption unit 220 may be configured to apply Gaussian noise or salt-and-pepper noise to received uncorrupted training images. Similarly, if the first ANN 110 is being trained to be robust to lossy compression artefacts, the corruption unit 220 may be configured to apply compression to the received uncorrupted training images, with compression parameters matching or approximating those expected to be encountered during inference. The corruption unit 220 may be omitted in some embodiments, for example where the expected type and/or amount of corruption during inference is not known, or where the first ANN 110 and the second ANN 210 are trained using different training images.

Figure 3A:
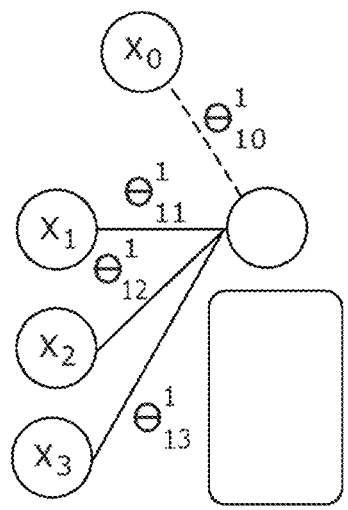
FIGS. 3(a) to 3(c) are schematic diagrams showing a neural network in accordance with embodiments.
Figure 3B:
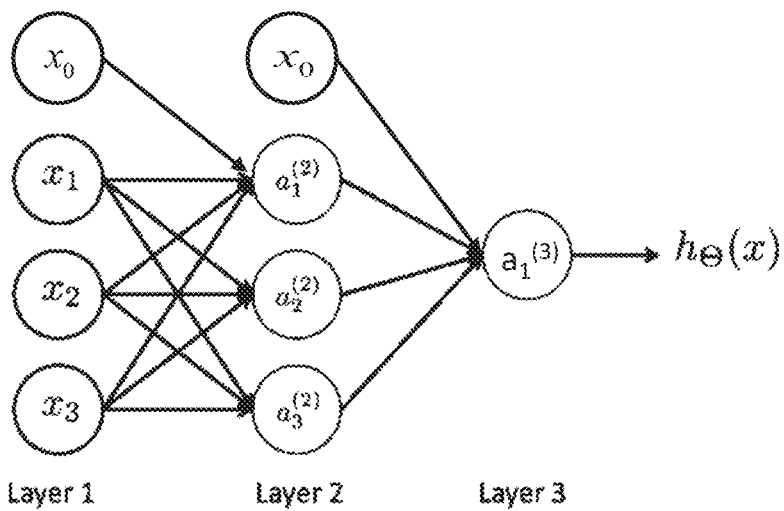
Figure 3C:
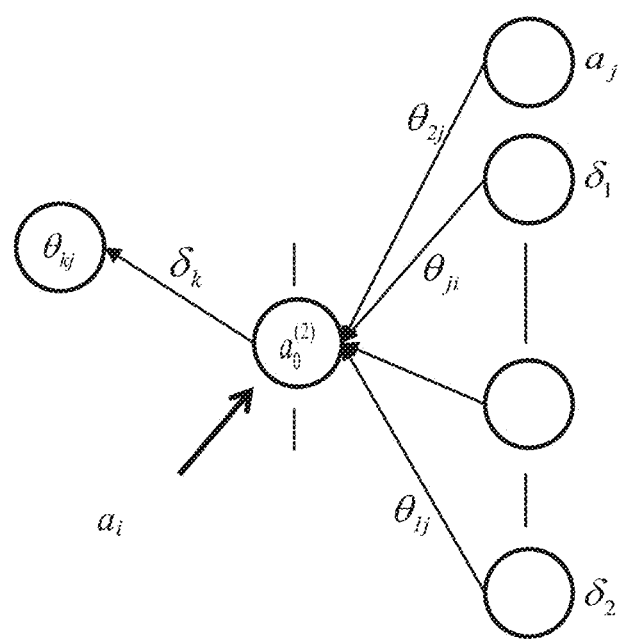
Figure 4:
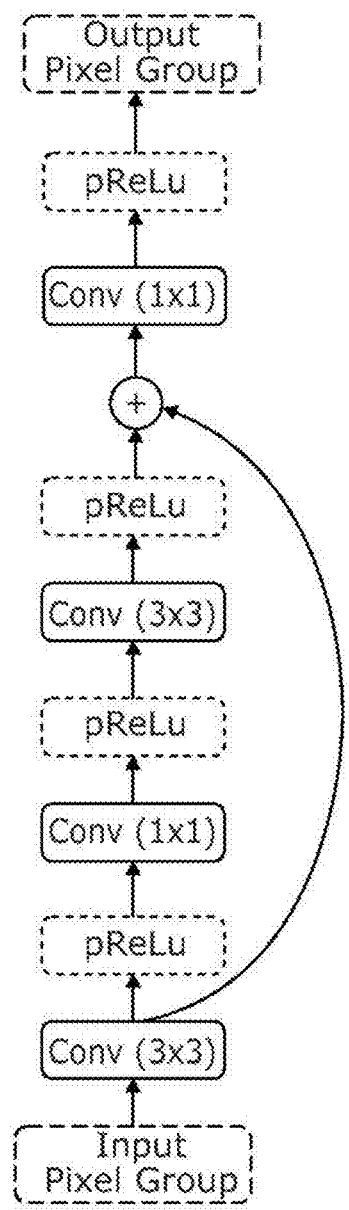
FIG. 4 is a schematic diagram showing a neural network in accordance with embodiments.

A neural network as described herein comprises a network of inter-connected learnable weights. One or both of the first ANN 110 and the second ANN 210 as described herein may comprise a convolutional neural network, CNN. Such a CNN comprises a stack of convolutional blocks, as shown in FIG. 4, and stacks of layers of fully-connected neural networks of the type shown in FIG. 3(b). In some embodiments, the convolutional blocks include dilated convolutions, strided convolutions, up/down-scaling operations, and/or normalization operations. In some embodiments, a given CNN includes a multi-resolution analysis of the image using a U-net architecture. A neural network as described herein can comprise any combination of weights connected in a network and having a non-linear function (akin to an activation function of an artificial neural network). An example of such connections and weights is shown in FIG. 3(a). An example of the global connectivity between weights and inputs is shown in FIG. 3(b). That is, FIG. 3(a) shows a combination of inputs $x_0, \ldots, x_3$ with weight coefficients θ and non-linear activation function g( ), and FIG. 3(b) is a schematic diagram showing layers of inter-connected activations and weights, forming an artificial neural network. Such examples are trained with back-propagation of errors computed at the output layer, using gradient descent methods. This is shown in FIG. 3(c), which depicts schematically the back-propagation of errors δ from coefficient $a_0^{(2)}$ of an intermediate layer to the previous intermediate layer using gradient descent.

An example multi-layer neural network processing pipeline is shown in FIG. 4. In particular, FIG. 4 shows a cascade of convolutional (Cony (k×k)) and parametric ReLu (pReLu) layers of weights and activation functions mapping input pixel groups to transformed output pixel groups. Each layer receives the representation from the previous layer. Convolutional layers extend the example of FIG. 3(b) to multiple dimensions, by performing convolution operations between multi-dimensional filters of fixed kernel size (k×k) with learnable weights and the inputs to the layer. In embodiments, some layers have dilated convolutions or pooling components to increase or decrease the resolution of the receptive field. The connectivity of the cascade of convolutional layers and activation functions can also include skip connections, as shown by the connection from the output of the leftmost "Cony (3×3)" layer of FIG. 4 to the summation point of FIG. 4. In addition, the entirety of the cascade of multiple layers (also known as a deep neural network) is trainable end-to-end based on back-propagation of errors from the output layer backwards (e.g. as shown in FIG. 3(c)), using gradient descent methods.

The output of each CNN can be either a 2D image (or 3D video) or a 1D vector of features. In the latter case the last convolutional layer is vectorized either by reshaping to 1D or alternatively by using a global pooling approach (e.g. global average pooling or global max pooling). The dimensionality of the vector is the number of channels in the last convolutional layer. If the output is 1D, the vectorization may be followed by one or more dense layers (as shown in FIG. 3(b)). Similarly, the inputs to both CNNs may be 2D images (or 3D video) or 1D vectors of features.

As shown in FIGS. 3 and 4, neural networks are generally composed of cascaded units. In embodiments, the output of these individual cascaded units represent the intermediate features of the neural network. For example, a given convolutional neural network may have a cascade of convolutional neural units applied to the input. The individual outputs of these cascaded units represent the features of the network. Such features may be used to train the first ANN 110, e.g. by aligning the features of the first ANN 110 with the corresponding features of the second ANN 210.

Figure 5A:
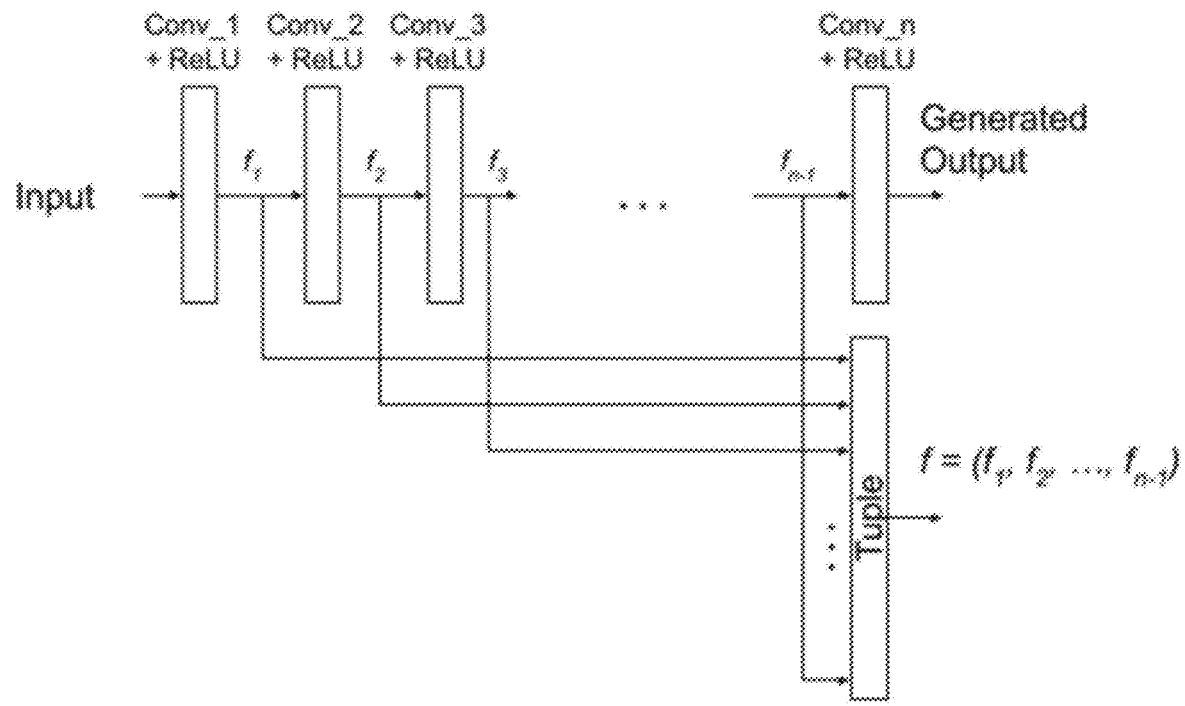
FIGS. 5(a) to 5(d) are schematic diagrams showing examples of neural networks in accordance with embodiments.

A more general example of a cascade of neural network units is shown schematically in FIG. 5(a), which depicts a series of convolutional layers. In the example shown in FIG. 5(a), individual feature vectors (output from each layer) are concatenated to form a tuple. Such a tuple, or one or more of the individual features, may be used by the feature regularization loss function to align the features of the first ANN 110 with the features of the second ANN 210. One implementation of a convolutional layer, which may be used to generate an intermediate feature vector, is shown in FIG. 5(c).

Figure 5B:
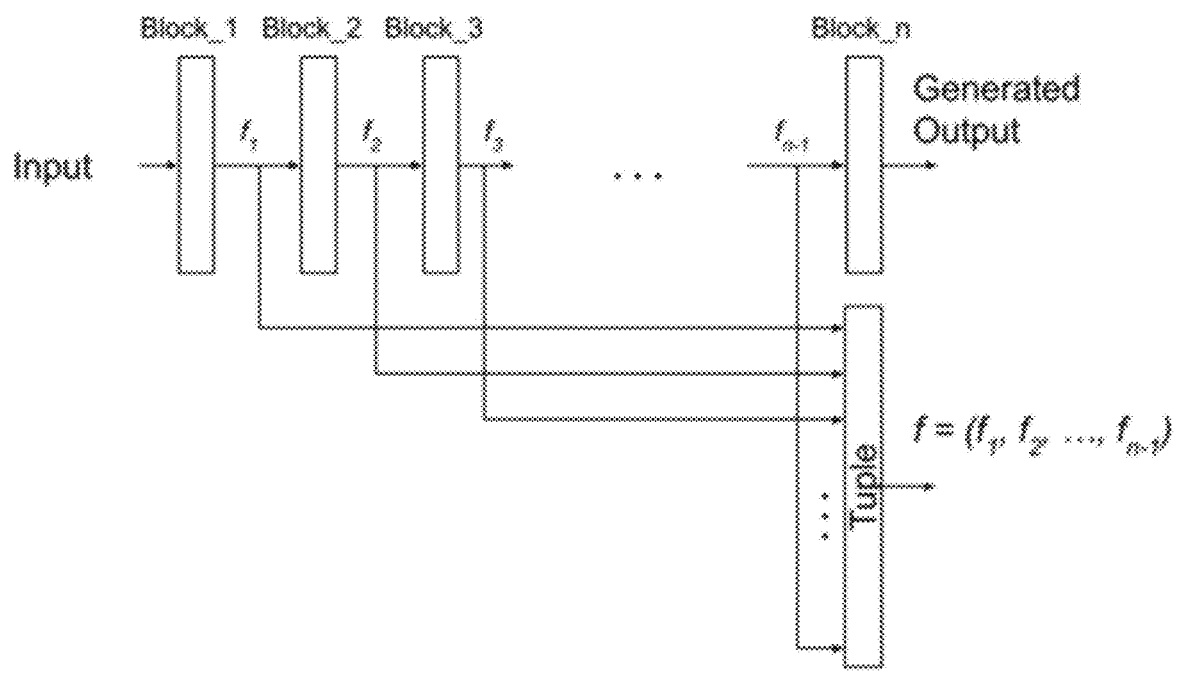
Figure 5C:
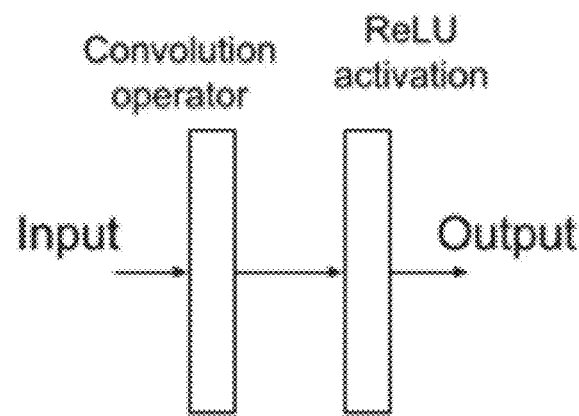
Figure 5D:
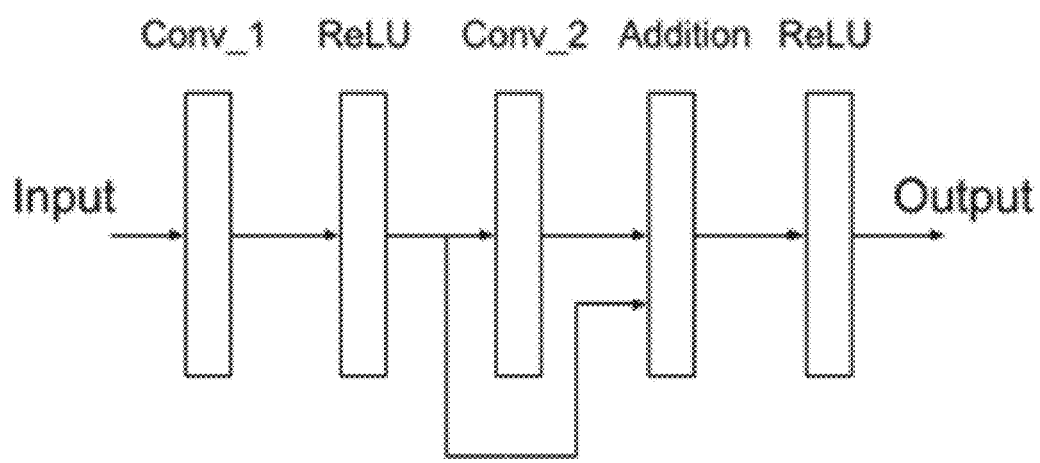

FIG. 5(b) shows an example of a network which does not use convolutional layers, but is instead based on ResBlocks. Such a network comprises a cascade of multiple ResBlocks. In this case, the outputs of the individual ResBlocks may form a feature tuple, usable to align the features of the first ANN 110 with the features of the second ANN 210. One implementation of a ResBlock is shown in FIG. 5(d). Features can, therefore, be extracted from a variety of different neural network architectures, each of which may be used to implement the presently described methods. As such, the methods described herein are not limited to a particular type of network architecture. For example, the first and second ANNs 110, 210 are not CNNs in some examples.

A regularization loss function which is configured to align the features of the first ANN 110 with the features of the second ANN 210, such as the regularization loss function 230 shown in FIG. 2, may take different forms.

In embodiments, the regularization loss function determines an L1 loss and/or a least square errors (L2 loss) between the feature vector of the first ANN 110 and the feature vector of the second ANN 210. That is, the regularization loss function may be of the form: $L_{reg}=\Sigma_{i=1}^{n}|f^{(c)}_i-f_i|$, where $f^{(c)}_i$ indicates the n features of the layers of the first ANN 110, and $f_i$ indicates the n features of the layers of the second ANN 210. Features of the deeper layers of the respective ANNs correspond to larger values of i. The regularization loss function operates to minimize such losses, e.g. by adjusting the weights of the first ANN 110 so as to reduce the $L_{reg}$ losses.

The regularization loss function may be based on other losses in alternative embodiments. For example, a Kullback-Leibler, KL, divergence between the features individually or together may be determined and minimized to train the first ANN 110.

In embodiments, the regularization loss function is a weighted loss function. That is, the regularization loss function may be of the form $L_{reg}=\Sigma_{i=1}^{n}w_i|f^{(c)}_i-f_i|$, where the weights $w_i$ may be pre-defined to emphasize some features over other features. For example, the weights may be linearly increasing to give more weight to deeper features (corresponding to deeper layers of the neural network). Alternatively, the weights may be linearly decreasing to give more weight to shallower features. In embodiments, the weights are learnable. That is, the weights may be trainable, e.g. to facilitate the alignment of the first ANN 110 with the second ANN 210 and/or to optimize the output of the first ANN 110.

In embodiments, the first ANN 110 is trained using a third ANN configured to distinguish between the features of the first ANN 110 and the features of the second ANN 210. The third ANN may be referred to as a "critic" or "discriminator" neural network. The third ANN may be used in place of, or in addition to, the regularization loss function. The third ANN may be employed, for example, where the first ANN 110 and the second ANN 210 receive inputs from two different sources. In the example shown in FIG. 2 and described above, the first ANN 110 and the second ANN 210 receive different versions of the same input low-resolution image, x. That is, the second ANN 210 receives the uncorrupted version of the image x, whereas the first ANN 110 receives a corrupted version, $x_c$, which has passed through the corruption unit 220. In some embodiments, however, the second ANN 210 receives an uncorrupted version of a first image, whereas the first ANN 110 receives a corrupted version of a second, different image. In such cases, the third ANN may be employed, using the principle of adversarial training.

In embodiments where the third ANN is used, the first ANN 110 is trained to "fool" the third ANN into presuming that the features of the first ANN 110 are actually the features of the second ANN 210. This ensures that the features of the first ANN 110 will be aligned to the features of the second ANN 210. Mathematically, let $F_c$ and F represent single vector representations of the features of the first ANN 110 and the second ANN 210, respectively. A single vector representation can be obtained by flattening the individual feature vectors and concatenating them. The third ANN, D, is trained to distinguish between the features F and $F_c$. Assuming binary cross entropy loss, the third ANN may be trained to minimize the loss: $L_D=-\Sigma_i \log(D(F))+\log(1-D(F_c))$. The first ANN 110, on the other hand, may be trained to "fool" the third ANN by minimizing the loss: $L_{N1}=\Sigma_i \log(1-D(F_c))$, or alternatively $L_{N1}=-\Sigma_i \log(D(F_c))$.

As such, the features of the first ANN 110 may be aligned to the features of the second ANN 210 without the use of the regularization loss function 230 in some embodiments, e.g. where the third ANN is used. In some cases, both the third ANN and the regularization loss function are used.

Figure 6:
FIGS. 6(a) to 6(c) are examples of an uncorrupted low-resolution image, a corresponding corrupted low-resolution image, and a corresponding high-resolution image, respectively, in accordance with embodiments.
Figure 6:
Figure 6:

FIG. 6 shows an example of uncorrupted and corrupted low-resolution images (see FIGS. 6(a) and 6(b), respectively), and a corresponding high-resolution output (FIG. 6(c)). The corrupted low-resolution image in the example shown in FIG. 6(b) is obtained by performing JPEG compression on the uncorrupted low-resolution image shown in FIG. 6(a). As discussed herein, it is a technically challenging task for an ANN to obtain a high-resolution image from a low-resolution image, even if the low-resolution image is uncorrupted (or "clean"). However, if the input image is corrupted, critical details of the scene depicted in the image may be lost. The methods described herein provide an additional form of supervision, from a second ANN trained using uncorrupted images, to improve the performance of the first ANN in processing such corrupted images.

Figure 7A:
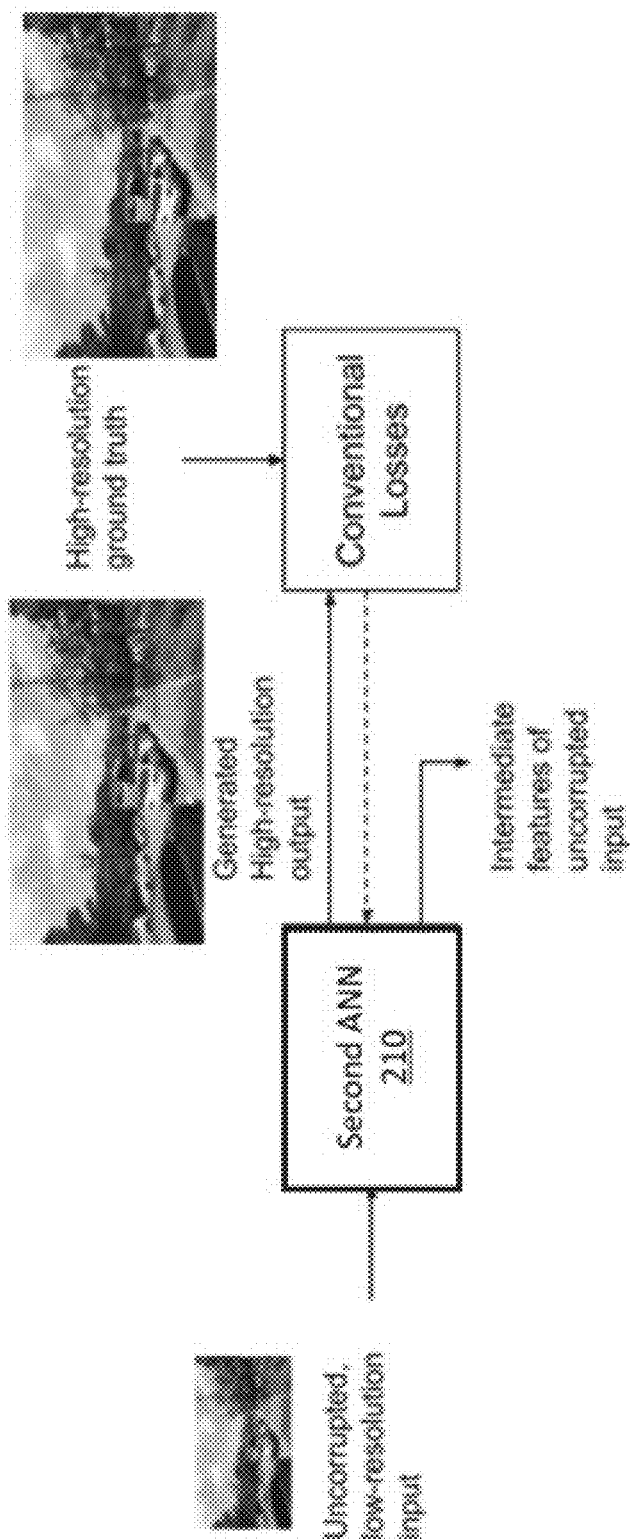
FIGS. 7(a) and 7(b) are schematic workflow diagrams showing an example training process in accordance with embodiments.
Figure 7B:
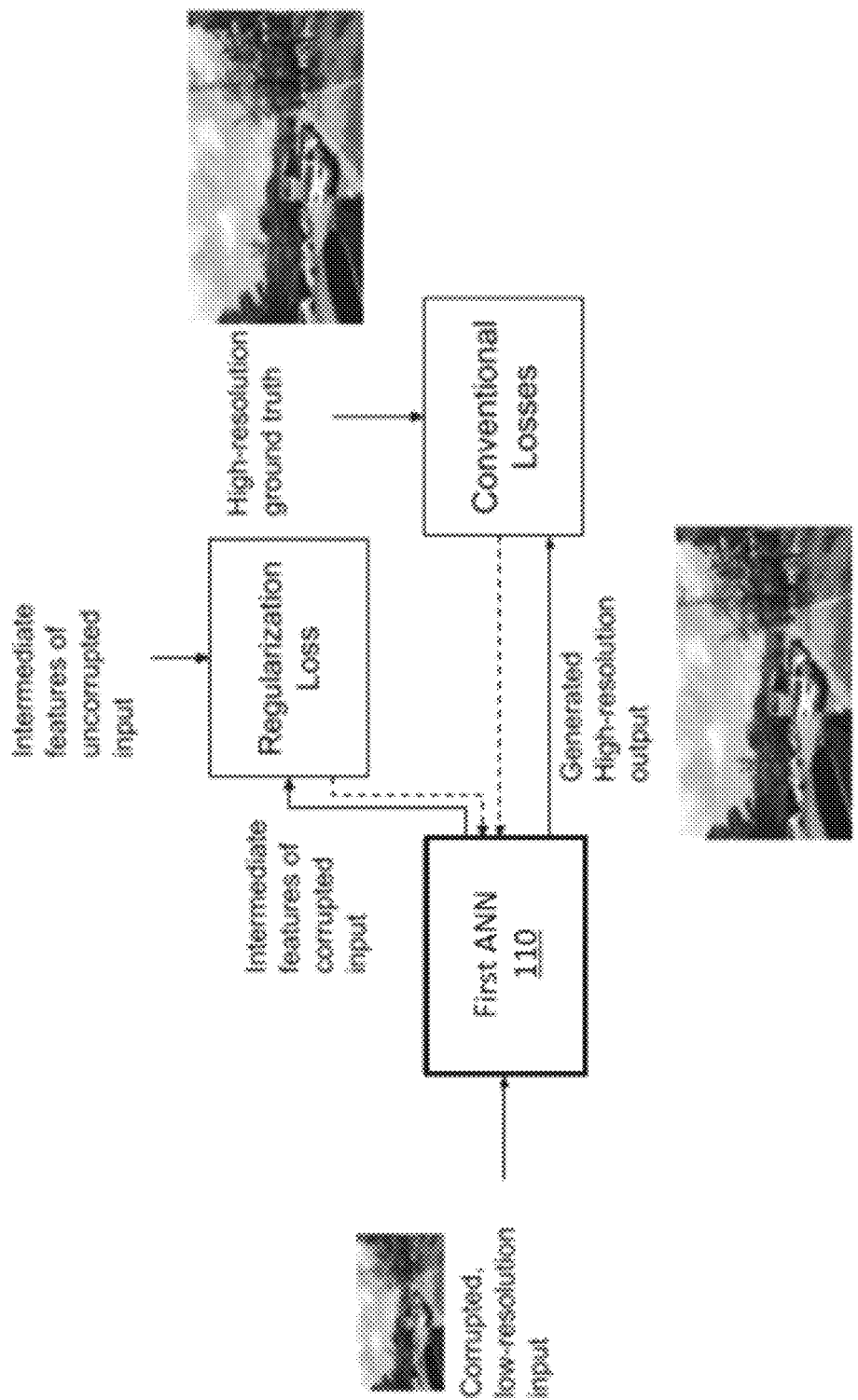

FIGS. 7(a) and 7(b) show examples of a training process for training the first ANN 110.

The first stage, shown in FIG. 7(a), is to extract features, e.g. intermediate features, from the second ANN 210, which is trained using uncorrupted input images. If the second ANN 210 is trained simultaneously with the first ANN 110, then the upscaling losses between the output generated by the second ANN 210 and the ground truth images are also calculated, and parameters (e.g. weights) of the second ANN 210 are updated to minimize the upscaling losses. If the second ANN 210 has already been trained, then only the features of the second ANN 210 are extracted, and the parameters of the second ANN 210 itself remain unchanged.

In the second stage, shown in FIG. 7(b), the features obtained from the second ANN 210 are used to compute the regularization loss. The parameters, e.g. weights, of the first ANN 110 are then updated to minimize both: the upscaling losses between the output generated by the first ANN 110 and the ground truth images; and the regularization loss. The additional supervision from the second ANN 210 allows the first ANN 110 to generate better quality outputs, i.e. upscaled images, compared to a case in which no such additional supervision is provided.

After training, the first ANN 110 is capable of generating high-resolution images at an improved level of quality, using previously-unseen corrupted (or otherwise low quality) low-resolution images as input. Therefore, in embodiments, only the first ANN 110, and not the second ANN 210, is used at inference to upscale low-resolution images.

Figure 8A:
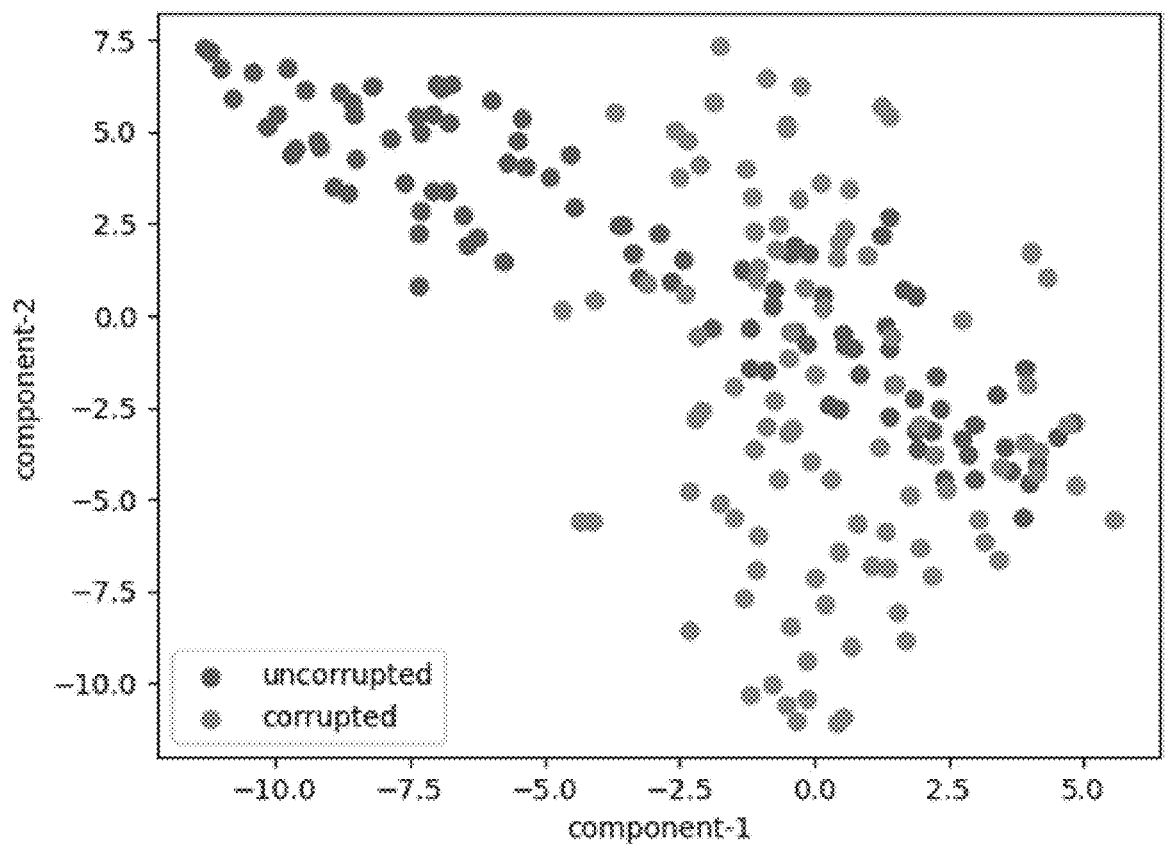
FIGS. 8(a) and 8(b) are t-distributed stochastic neighbor embedding (t-SNE) graphs showing examples of feature vectors for uncorrupted and corrupted images without using feature regularization loss and with the use of feature regularization loss, respectively, in accordance with embodiments.
Figure 8B:
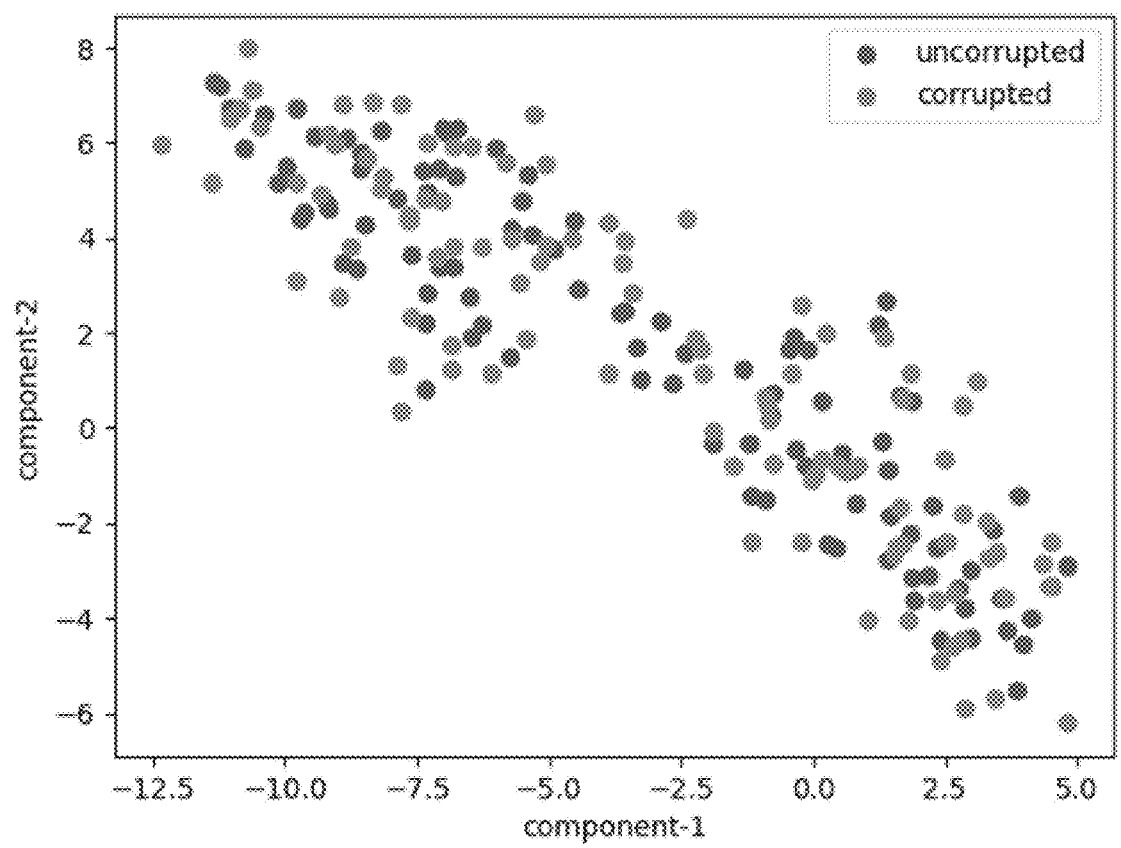

FIGS. 8(a) and 8(b) show t-SNE (t-distributed stochastic neighbor embedding) plots of an example of an intermediate feature vector for a batch of uncorrupted and corrupted images. FIG. 8(a) shows a t-SNE plot without the use of feature regularization loss, in which the feature vector for the corrupted images is not aligned with the feature vector for the uncorrupted images. FIG. 8(b) shows a t-SNE plot with the use of feature regularization loss, in which the feature vector for the corrupted images and the feature vector for the uncorrupted images are better aligned.

Figure 9:
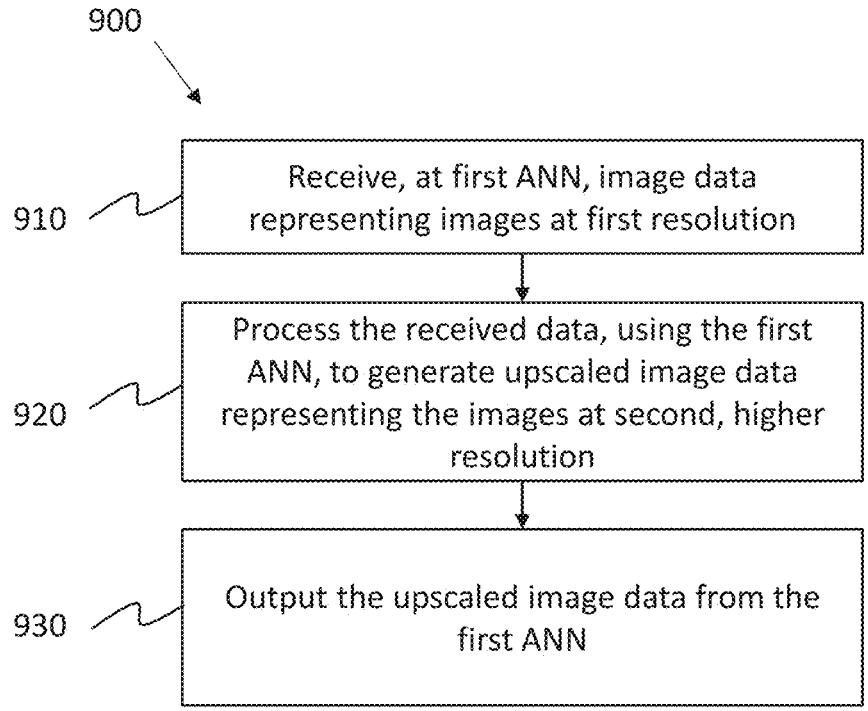
FIG. 9 is a flowchart showing the steps of a method of processing image data in accordance with embodiments.

FIG. 9 shows a method 900 for processing image data. The method 900 may be performed by a computing device, according to embodiments. The method 900 may be performed at least in part by hardware and/or software. In embodiments, the method 900 is performed at least in part by an encoder apparatus. Such an encoder apparatus may be operable to send data to one or more decoders, e.g. via a wireless network, and/or to store data in a storage medium. In other embodiments, the method 900 is performed at least in part by a decoder apparatus. Such a decoder apparatus may be operable to receive data from one or more encoders and process the received data for display at a display device.

At item 910, image data is received at a first ANN. The image data represents one or more images at a first resolution. In embodiments, the image data is at a first level of quality. The image data may be pixel data, according to embodiments. The image data may be retrieved from storage (e.g. in a memory), or may be received from another entity (e.g. live camera feed, encoder apparatus, etc.).

At item 920, the received image data is processed using the first ANN to generate upscaled image data. The upscaled image data represents the one or more images at a second, higher resolution. As such, the first ANN is configured to upscale (i.e. increase the resolution of) image data that is input to the first ANN.

At item 930, the upscaled image data is outputted from the first ANN. The upscaled image data may be outputted for display at a display device, for example. In other embodiments, e.g. where the method 900 is performed at an encoder apparatus, the upscaled image data may be used for content recycling, e.g. for image de-noising prior to encoding.

As stated above, the first ANN is trained (e.g. has been trained) to perform image upscaling. The first ANN is trained using first training image data representing one or more training images at the first resolution. The first training image data is at a first level of quality. The first ANN is also trained using a feature vector comprising features generated by one or more layers of a second ANN. The second ANN is trained (e.g. has been trained) to perform image upscaling. The second ANN is trained using second training image data representing one or more training images at the first resolution. The second training image data is at a second level of quality, higher than the first level of quality. As such, the second ANN is trained using training image data that is of a higher level of quality than the training image data used to train the first ANN.

In embodiments, the feature vector comprises an intermediate feature vector comprising features generated by one or more intermediate layers of the second ANN. In embodiments, the feature vector is used as a target for training the first ANN.

In embodiments, the first ANN is trained using a feature regularization loss function configured to determine a difference between a feature vector comprising features generated by one or more layers of the first ANN and the feature vector generated by the second ANN. The first ANN may be trained by adjusting the first ANN to reduce the difference as determined by the feature regularization loss function.

In embodiments, the feature regularization loss function is operable to determine at least one of: an L1-norm loss, a divergence loss, and an adversarial loss, between the feature vector generated by the first ANN and the feature vector generated by the second ANN.

In embodiments, the first ANN and the second ANN have the same architecture. In alternative embodiments, the first ANN and the second ANN have different architectures.

In embodiments, the first ANN and the second ANN comprise the same number of layers and/or parameters. In embodiments, the first ANN comprises more layers and/or parameters than the second ANN. In alternative embodiments, the first ANN comprises fewer layers and/or parameters than the second ANN.

In embodiments, the image data representing the one or more images at the first resolution received at the first ANN is at the first level of quality.

In embodiments, the first training image data and the second training image data represent the same one or more images at different levels of quality.

In embodiments, the first training image data is generated by corrupting the second training image data.

In embodiments, corrupting the second training image data is based on an expected type and/or amount of corruption associated with the image data representing the one or more images received at the first ANN.

In embodiments, corrupting the second training image data comprises applying noise to the second training image data. In embodiments, corrupting the second training image data comprises compressing the second training image data.

In embodiments, the first ANN and the second ANN are trained simultaneously. In alternative embodiments, the first ANN is trained after the second ANN has been trained.

In embodiments, the first ANN is trained by minimizing losses between upscaled image data, generated by the first ANN using the first training image data and representing the one or more training images at the second resolution, and ground truth image data representing the one or more training images at the second resolution.

In embodiments, the first ANN is trained using a third ANN configured to distinguish between features of the first ANN and features of the second ANN.

Figure 10:
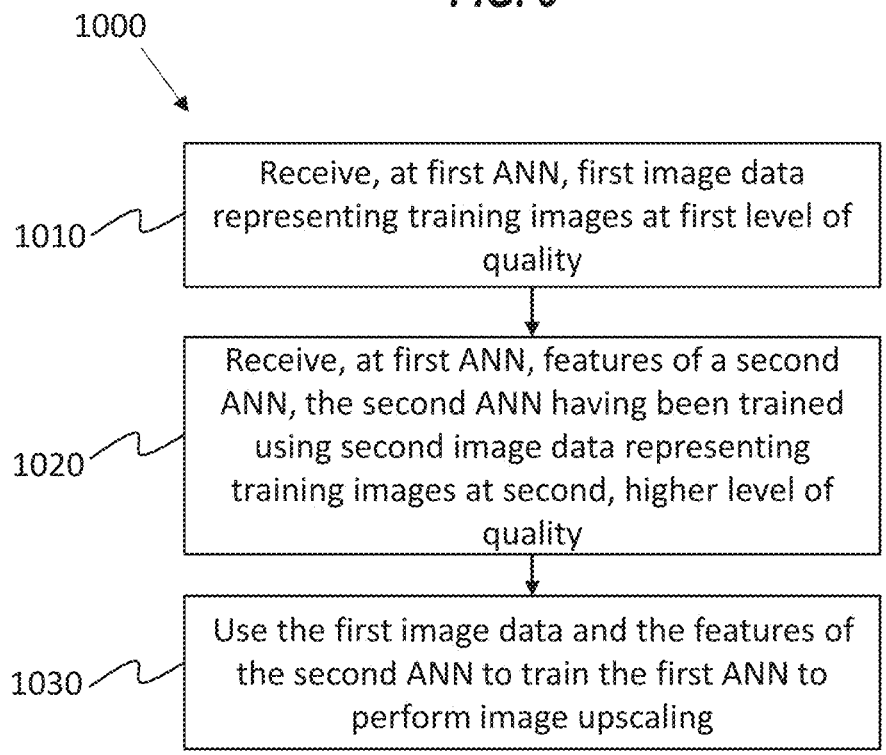
FIG. 10 is a flowchart showing the steps of a method of configuring an artificial neural network in accordance with embodiments.

FIG. 10 shows a method 1000 of configuring an artificial neural network (ANN) to perform image upscaling. The method 1000 may be performed by a computing device, according to embodiments. The method 1000 may be performed at least in part by hardware and/or software. In embodiments, the method 1000 is performed at least in part by an encoder apparatus. Such an encoder apparatus may be operable to send data to one or more decoders, e.g. via a wireless network, and/or to store data in a storage medium. In other embodiments, the method 1000 is performed at least in part by a decoder apparatus. Such a decoder apparatus may be operable to receive data from one or more encoders and process the received data for display at a display device.

At item 1010, first image data is received at a first ANN. The first image data represents one or more training images at a first resolution. The first image data is at a first level of quality.

At item 1020, data derived from features of a second ANN is received at the first ANN. The second ANN has been trained to generate upscaled image data at a second resolution, higher than the first resolution. The second ANN has been trained using second image data representing one or more training images at the first resolution. The second image data is at a second level of quality, higher than the first level of quality. In embodiments, the features of the second ANN comprise an intermediate feature vector generated by the second ANN. In embodiments, the data derived from the features of the second ANN comprises one or more regularization losses calculated based on the intermediate feature vector of the second ANN.

At item 1030, the first image data and the data derived from the features of the second ANN are used to train the first ANN to perform image upscaling.

Figure 11:
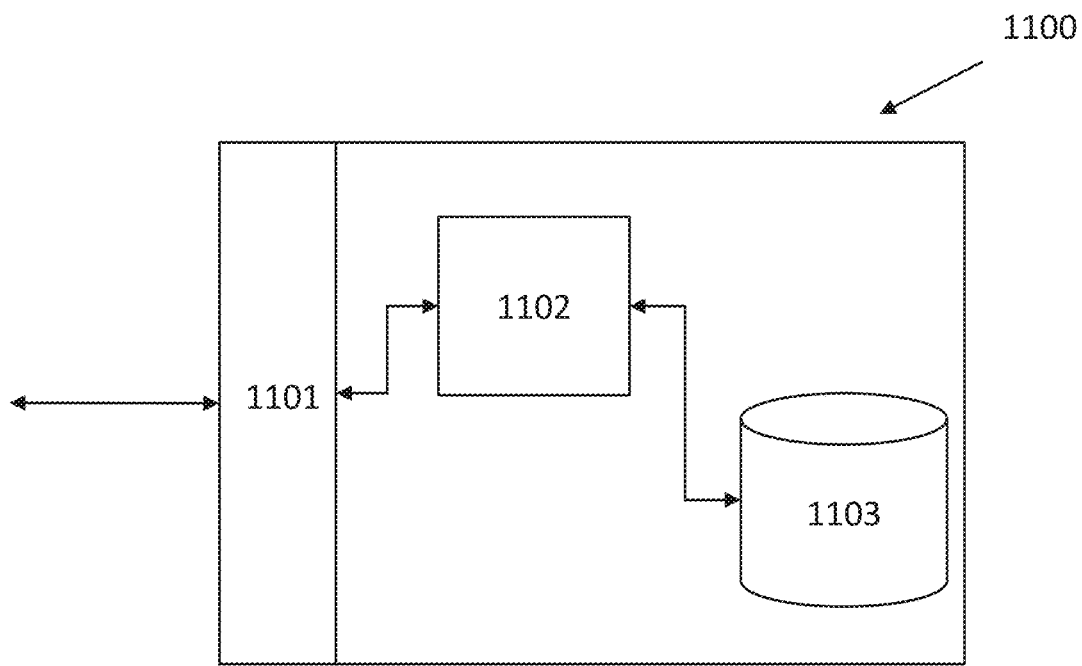
FIG. 11 is a schematic diagram of a computing device in accordance with embodiments.

Embodiments of the disclosure include the methods described above performed on a computing device, such as the computing device 1100 shown in FIG. 11. The computing device 1100 comprises a data interface 1101, through which data can be sent or received, for example over a network. The computing device 1100 further comprises a processor 1102 in communication with the data interface 1101, and memory 1103 in communication with the processor 1102. In this way, the computing device 1100 can receive data, such as image data, video data, or various data structures, via the data interface 1101, and the processor 1102 can store the received data in the memory 1103, and process it so as to perform the methods described herein, including processing image data and/or generating images.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The present disclosure also provides various means (e.g. methods, systems, computer programs, etc.) for upscaling noisy images and/or videos. A first neural network is trained with noisy low-resolution images and high-resolution images. A second neural network is trained with clean low-resolution images and high-resolution images. The second neural network is trained for upscaling of the clean low-resolution images. A feature regularization loss unit ensures that intermediate feature vectors of the first neural network are aligned to feature vectors of the second neural network. The first neural network, when trained, is deployed for inference on unseen noisy low-resolution input images using only the input noisy low-resolution images and no high quality or high-resolution images.

In embodiments, a transformation block is used that corrupts the clean low-resolution input images to make synthetically-corrupted low-resolution images.

In embodiments, the feature regularization loss unit includes at least one of the following losses: an L1-norm loss; a divergence loss; an adversarial loss.

In embodiments, the first and second neural networks are trained one after the other with batches of data.

In embodiments, the first and second neural networks are trained simultaneously with each input batch of data.

In embodiments, the first and second neural networks are trained together in parallel.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

What is claimed is:

1. A computer-implemented method of processing image data, the method comprising:
receiving, at a first artificial neural network, ANN, image data representing one or more images at a first resolution;

processing the received image data using the first ANN to generate upscaled image data representing the one or more images at a second resolution, higher than the first resolution; and outputting the upscaled image data from the first ANN, wherein the first ANN is trained to perform image upscaling and is trained using:

first training image data representing one or more training images at the first resolution, the first training image data being at a first level of quality; and a feature vector comprising features generated by one or more layers of a second ANN, wherein the second ANN is trained to perform image upscaling and is trained using second training image data representing one or more training images at the first resolution, the second training image data being at a second level of quality, higher than the first level of quality.

2. The method according to claim 1, wherein the feature vector comprises an intermediate feature vector comprising features generated by one or more intermediate layers of the second ANN.

3. The method according to claim 1, wherein the feature vector is used as a target for training the first ANN.

4. The method according to claim 1,
wherein the first ANN is trained using a feature regularization loss function configured to determine a difference between a feature vector comprising features generated by one or more layers of the first ANN and the feature vector generated by the second ANN, and
wherein the first ANN is trained by adjusting the first ANN to reduce the difference as determined by the feature regularization loss function.

5. The method according to claim 4, wherein the feature regularization loss function is operable to determine at least one of: an L1-norm loss, a divergence loss, and an adversarial loss, between the feature vector generated by the first ANN and the feature vector generated by the second ANN.

6. The method according to claim 1, wherein the first ANN and the second ANN have a same architecture.

7. The method according to claim 1, wherein the first ANN and the second ANN comprise a same number of layers and/or parameters, or the first ANN comprises more layers and/or parameters than the second ANN.

8. The method according to claim 1, wherein the image data representing the one or more images at the first resolution received at the first ANN is at the first level of quality.

9. The method according to claim 1, wherein the first training image data and the second training image data represent a same one or more images at different levels of quality.

10. The method according to claim 1, wherein the first training image data is generated by corrupting the second training image data.

11. The method according to claim 10, wherein corrupting the second training image data is based on an expected type and/or amount of corruption associated with the image data representing the one or more images received at the first ANN.

12. The method according to claim 10, wherein corrupting the second training image data comprises applying noise to the second training image data.

13. The method according to claim 10, wherein corrupting the second training image data comprises compressing the second training image data.

14. The method according to claim 1, wherein the first ANN and the second ANN are trained simultaneously.

15. The method according to claim 1, wherein the first ANN is trained after the second ANN has been trained.

16. The method according to claim 1, wherein the first ANN is trained by minimizing losses between upscaled image data, generated by the first ANN using the first training image data and representing the one or more training images at the second resolution, and ground truth image data representing the one or more training images at the second resolution.

17. The method according to claim 1, wherein the first ANN is trained using a third ANN configured to distinguish between features of the first ANN and features of the second ANN.

18. A computer-implemented method of configuring an artificial neural network, ANN, to perform image upscaling, the method comprising:

receiving, at a first ANN, first image data representing one or more training images at a first resolution, the first image data being at a first level of quality;

receiving at the first ANN, data derived from features of a second ANN, the second ANN having been trained to generate upscaled image data at a second, higher resolution, the second ANN having been trained using second image data representing one or more training images at the first resolution, the second image data being at a second level of quality, higher than the first level of quality; and using the first image data and the data derived from the features of the second ANN to train the first ANN to perform image upscaling.

19. A computing device comprising:

a memory comprising computer-executable instructions;

a processor configured to execute the computer-executable instructions and cause the computing device to perform a method of processing image data, the method comprising:

receiving, at a first artificial neural network, ANN, image data representing one or more images at a first resolution;

processing the received image data using the first ANN to generate upscaled image data representing the one or more images at a second resolution, higher than the first resolution; and outputting the upscaled image data from the first ANN, wherein the first ANN is trained to perform image upscaling and is trained using:

first training image data representing one or more training images at the first resolution, the first training image data being at a first level of quality; and a feature vector comprising features generated by one or more layers of a second ANN, wherein the second ANN is trained to perform image upscaling and is trained using second training image data representing one or more training images at the first resolution, the second training image data being at a second level of quality, higher than the first level of quality.

20. A non-transitory computer-readable medium comprising computer-executable instructions that, when executed by a processor of a computing device, cause the computing device to perform a method of processing image data, the method comprising:

receiving, at a first artificial neural network, ANN, image data representing one or more images at a first resolution;

processing the received image data using the first ANN to generate upscaled image data representing the one or more images at a second resolution, higher than the first resolution; and outputting the upscaled image data from the first ANN, wherein the first ANN is trained to perform image upscaling and is trained using:

first training image data representing one or more training images at the first resolution, the first training image data being at a first level of quality; and a feature vector comprising features generated by one or more layers of a second ANN, wherein the second ANN is trained to perform image upscaling and is trained using second training image data representing one or more training images at the first resolution, the second training image data being at a second level of quality, higher than the first level of quality.

* * * * *